United States Patent Office 2,913,506
Patented Nov. 17, 1959

2,913,506

POLYMERIZATION OF OLEFINS USING A PHOSPHORIC ACID CATALYST AND MANUFACTURE OF SAID PHOSPHORIC ACID CATALYST

Willem F. Engel, Amsterdam, Netherlands, assignor to Shell Development Company, New York, N.Y., a corporation of Delaware No Drawing. Application November 5, 1956
Serial No. 620,206

Claims priority, application Netherlands
November 29, 1955

6 Claims. (Cl. 260—683.15)

This invention relates to improved solid catalysts, to the preparation of such catalysts and to improved conversion reactions utilizing such catalysts. More specifically, the invention relates to an improvement in catalysts containing an acid of phosphorus in combination with kieselguhr, useful in the conversion of organic substances such as in the polymerization of olefins, the alkylation of aromatic hydrocarbons and the hydration of olefins.

It is an object of this invention to produce a catalyst which has a high conversion activity in the polymerization of olefins and a high resistance to crushing during use. It is a further object to provide an improved conversion process utilizing such a catalyst.

It is known that, starting from phosphoric acid, particularly pyro- or orthophosphoric acid, and a silicon-containing carrier such as kieselguhr, it is possible to prepare active polymerization catalysts. The usual method by which these so-called solid phosphoric-acid catalysts are prepared in practice consists in kneading to a plastic mass the phosphoric acid with powdery kieselguhr (usually in such a proportion that the final product contains 65 to 70% by weight of phosphoric acid, calculated as $P_2O_5$) shaping the mass into pieces by extruding and cutting, and subsequently calcining the pieces at temperatures of over 300° C. A treatment with steam at 200° C.–300° C. is then carried out in order to convert the phosphoric acid into a partly hydrated form required for good activity.

The catalysts prepared in this way have good activity but they have a relatively low mechanical strength, so that when these catalysts are used breakdowns may occur as a result of the reactors becoming clogged, particularly when the required degree of hydration of the catalyst is exceeded.

It has now been found that by preparing catalysts by the process according to the present invention, in which a mixture of kieselguhr and a phosphoric acid is subjected to mechanical pressure at controlled conditions before shaping and calcining, it is possible to produce solid phosphoric-acid catalysts which have great mechanical strength and particularly high activity for the polymerization of olefins, superior to that of conventionally prepared solid phosphoric-acid catalysts.

In preparing a catalyst in accordance with the present invention, powdered kieselguhr is mixed with pyrophosphoric acid in such proportions that the phosphoric acid content of the final catalyst is in the range between about 60 and about 80% by weight (calculated as $P_2O_5$). The preferred concentration range is between 65 and 75% by weight. Other acids of phosphorus may be present in small amounts in pyrophosphoric acid. The mixing is preferably carried out at a temperature above the melting point of pyrophosphoric acid (61° C.). The resulting mixture is then subjected to mechanical pressure at a temperature not exceeding about 150° C. for a sufficient length of time and at a sufficient pressure to cause the mixture, which is originally semi-solid and granular, to assume a vitreous appearance. Generally, the color of the mixture changes during this compression step, becoming darker and turning from gray to brown. The minimum pressure required for the change in appearance to be produced may vary according to the nature of the phosphoric acid used, the type of kieselguhr, and the temperature at which the pressure treatment is carried out. Pressures of at least 140 lbs. per square inch are usually necessary. Preferably higher pressures, e.g., from 200 to 300 lbs. per square inch or higher are used, as the mass thereby passes over into a vitreous state more rapidly than at lower pressures. At temperatures above about 150° C. the change to a vitreous mass is not observed.

As soon as the vitreous state has set in, the pressure treatment may be terminated; if desired it may also be continued for some time. The change in appearance does not take place instantaneously. It generally requires from 5 seconds to 2 minutes.

After the mechanical pressure has been released the mass may be heated for a further period, e.g. some hours, at 150 to 200° C., in order to remove entirely or partly the water present or formed during the reaction of the phosphoric acid with kieselguhr. The mass may be worked up into formed pieces in a known manner, e.g. by compression to tablets or cutting or granulating to pieces of the desired size.

The formed pieces obtained are then calcined, for which purpose they are heated to high temperatures, usually between 300° C. and 400° C., e.g. to 350° C. for a time from less than 1 hour to several hours. Higher calcination temperatures may also be used.

After this calcination it may be necessary to treat the catalyst with steam at 200° to 300° C. in order to bring the degree of hydration to the desired value should it be too low, after which the catalyst is dried at a temperature of, for example, approximately 300° C. while exposed to a flowing stream of a dry gas such as air, and is then cooled.

In preparing the catalysts according to the invention it is advisable to avoid operations which lead to the formation of a plastic mass, e.g. kneading, as it has been found that such operations, whether carried out before or after the pressure treatment, generally have a substantial adverse effect on the activity of the final catalyst.

The catalysts prepared according to the invention not only have a great mechanical strength, but also a high activity, considerably superior to that of the conventionally prepared solid phosphoric-acid catalysts.

The resulting catalysts are particularly suitable for converting normally gaseous olefins such as propylene and butylenes into liquid polymers intended for the preparation of motor fuels. They may also be used with excellent results for polymerizing the said olefins to higher polymers comprising 12 to 19 carbon atoms, e.g. propene tetramer, pentamer and hexamer, copolymers of different monoalkenes, and hydrocarbon mixtures containing one or more of these polymers.

When employed in the conversion of olefinic hydrocarbons into polymers, the calcined catalyst formed as herein set forth is preferably employed as a granular layer in a heated reactor, which is generally made from steel, and through which the preheated hydrocarbon fraction is directed. Thus the solid catalyst of this process may be employed for treating olefin-containing hydrocarbon vapors to effect olefin polymerization, but this same catalyst may also be used at operating conditions suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical tower and the olefin-containing gas mixture is passed downwardly therethrough at a temperature of from about 180° to about 290° C. and a pressure of 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 120° to about 160° C. and at pressures of from about 500 to about 1500 pounds per square inch.

When the catalysts of this invention are utilized for promoting miscellaneous organic reactions, the catalysts may be employed in essentially the same way as they are used when polymerizing olefins, in case the reactions are essentially vapor phase, and they also may be employed in suspension in liquid phase in various types of equipment.

In addition to polymerization reactions the catalyst of this invention may also be employed in the alkylation of cyclic compounds with olefins, the cyclic compounds including aromatic monocyclic and polycyclic compounds, naphthenes, and phenols; condensation reactions such as those occurring between ethers and aromatics, alcohols and aromatics, phenols and aldehydes, etc.; reactions involving the hydrohalogenation of unsaturated organic compounds, isomerization reactions, ester formation by the interaction of carboxylic acids and olefins, and the like. The catalysts are also suitable to catalyze the hydration of olefins to produce alcohols, e.g. of ethylene to ethanol. The specific procedure for utilizing the present type of catalysts in miscellaneous organic reactions will be determined by the chemical and physical characteristics and the phase of the reacting constituents.

During use of these catalysts in vapor phase polymerizations and other vapor phase treatments of organic compounds, it is often advisable to add small amounts of moisture to prevent excessive dehydration and subsequent decrease in catalyst activity. In order to substantially prevent loss of water from the catalyst an amount of water or water vapor such as steam is added to the charged reactant gas so as to substantially balance the vapor pressure of the catalyst. This amount of water vapor generally varies from about 0.1 to about 6% by volume of the organic material charged.

The process according to the invention and the effect obtained thereby will be further illustrated by the following examples.

EXAMPLE I

Three different types of kieselguhr, viz. of Algerian, German and American origin, were used as carrier.

30 parts by weight of powdery kieselguhr were mixed, while stirring at 100° C., with 70 parts by weight of pyrophosphoric acid, after which a pressure of about 220 pounds per square inch was exerted mechanically on the granular, semi-solid mixture obtained. This pressure treatment gave the mass a vitreous exterior, the color changing from gray to brown.

The mass thus treated was then heated for 2 hours to 180° C. and formed by granulation into grains, 5–10 mm. in size, which were subsequently calcined for 5 hours at 350° C. in a dry air stream and then treated with steam at 260° C. for 16 hours. Finally dry air was passed over at 305° C. for 15 minutes, after which the dried pieces were cooled in a dry air stream.

The resultant catalysts, of which the content of the free acid (viz. the percentage of acid soluble in water of 20° C., calculated as $P_2O_5$) varied according to the type of kieselguhr from 16 to 22% by weight and the content of extractable acid (viz. the percentage of acid extractable in water of 100° C., calculated as $P_2O_5$) varied from 51.7 to 60% by weight, had a great mechanical strength which only slightly decreased even after use for polymerization. In an unused state they had a crushing strength of over 40 pounds. The strength of catalysts prepared without pressure treatment, but otherwise in the same way, was only about 11 pounds.

The maximum load that the catalyst can resist when compressed between two flat steel plates. Average of 20 determinations.

EXAMPLE II

The catalysts prepared in the manner described in Example I were used for polymerizing propylene, for which purpose a mixture of propylene and propane, with 94 mol percent of propylene, was passed in vapor phase over the catalyst at a temperature of 204° C. and a pressure of 10.2 atm., and the polymerization product from the reactor effluent was condensed by cooling.

In order to assess the activity of these catalysts the mean flow rate (expressed in kg. of gas mixture passed through per liter of catalyst per hour) was determined over an 8-hour period, a propylene conversion of at least 70 to 80% by weight being attainable. For the purpose of comparison parallel tests were carried out with catalysts prepared in the same manner with the same types of kieselguhr, but without pressure treatment, and also with two commercial solid phosphoric acid-kieselguhr catalysts.

The results are given in Table I, which also contains data on the degree of hydration of the various catalysts as indicated by the percentages of free and extractable phosphoric acid.

*Table I*

| Catalyst | 1a | 1b | 1c | 2a | 2b | 2c | Commercial | |
|---|---|---|---|---|---|---|---|---|
| | | | | | | | 3a | 3b |
| Type of kieselguhr | Algerian | German | American | Algerian | German | American | | |
| Special treatment | Pressure treatment. | Pressure treatment. | Pressure treatment. | | | | | |
| Percent free $P_2O_5$ | 22 | 17.4 | 16 | 21.2 | 19.8 | 13.0 | 17.7 | 19.3 |
| Percent extractable $P_2O_5$ | 60 | 51.7 | 60 | 58.7 | 55.6 | 58.0 | 57.5 | 52 |
| Mean flow rate, kg. per liter of catalyst per hour | 0.42 | 0.60 | 0.40 | 0.19 | 0.21 | 0.20 | 0.24 | 0.22 |
| Propylene conversion, percent by weight | 85 | 87 | 82 | 70 | 70 | 70 | 71.4 | 73.8 |

These results show clearly that whereas in the case of the three catalysts prepared without pressure treatment, with a propylene conversion of 70%, the permissible flow rate was of the same order of magnitude as in the case of the two commercial catalysts, with the use of the catalysts obtained according to the invention, employing a pressure treatment, a considerable increase in the permissible flow rate was obtained.

EXAMPLE III

The following tests illustrate the extent to which the beneficial results obtained by preparing a catalyst according to the process of this invention are lost when the catalyst mass is subjected to kneading. A catalyst mixture was prepared by mixing 70 parts by weight of pyrophosphoric acid and 30 parts by weight of powdered kieselguhr. Part of this mixture was subjected to mechanical pressure until it was converted to a vitreous appearing mass. Another portion was subjected to kneading, in the manner in which solid phosphoric acid catalyst is conventionally prepared. A third portion was subjected to pressure and subsequently kneaded and the fourth portion was kneaded and subsequently compressed. The resulting catalyst masses were then, in each case, cut into 6 x 6 mm. tablets which were calcined at 350° C. for five hours and steamed at 260° C. for 16 hours to convert them to their most active form. The catalysts were then tested in the manner described in Example II. The relative activity of the catalysts is designated by an "activity number" which correlates the propylene conversion obtainable at various throughput rates. The activity is determined by the LHSV at which a given degree of conversion of propylene to polymer is obtained by passing a minimum 94% purity propylene over a predetermined amount of catalyst at about 205° C. and 150 p.s.i.g. The feed rate is varied to result in a predetermined amount of feed gas remaining unconverted. The "activity number" is, then, the percentage of 0.45 v./v./hr. which was actually attained, a correction factor for feed purity being applied. Thus, an activity number of 40 corresponds to a conversion of about 70% at a weight hourly space velocity of 0.25 kg./l./hr. An activity of 40 is considered satisfactory for commercial use. It will be seen from the data in Table II that the catalyst prepared according to the present invention has an outstandingly high activity whereas catalyst prepared by kneading alone had a relatively very low activity and catalysts prepared by combinations of compression and kneading had intermediate activities.

*Table II*

| Treatment of Kieselguhr-Pyrophosphoric acid mixture | Compression | Kneading | Compression followed by kneading | Kneading followed by compression |
| --- | --- | --- | --- | --- |
| Activity | ~60 | 15<br>¹ 18 | 33 | 36 |

¹ Additional calcination, 16 hours at 480° C.

I claim as my invention:

1. A process for manufacturing an improved solid catalyst which comprises mixing from about 60 to about 80% (calculated as $P_2O_5$) of pyrophosphoric acid with powdered kieselguhr, applying mechanical pressure of at least about 140 pounds per square inch to the mixture at a temperature not exceeding 150° C. for a minimum time of at least 5 seconds at pressures of about 300 pounds per square inch and higher, and longer minimum times, up to 2 minutes, at lower pressures, whereby said mixture is converted into a non-plastic mass having a vitreous appearance, shaping the resulting mass into particles and calcining said particles.

2. A phosphoric acid-kieselguhr catalyst prepared according to the process of claim 1, said catalyst comprising from about 60 to 80% (as $P_2O_5$) of an acid of phosphorus and having a vitreous appearance.

3. A process for the polymerization of olefins which comprises contacting an olefin-containing vapor stream with a catalyst of the class defined in claim 2 and hydrated to its active form at a temperature between 180° and 290° C. and a pressure between 100 and 1500 p.s.i.

4. A process for manufacturing an improved solid catalyst which comprises mixing from about 60 to about 80% (calculated as $P_2O_5$) of pyrophosphoric acid with powdered kieselguhr, applying a mechanical pressure of at least about 140 pounds per square inch to the mixture at a temperature not exceeding 150° C. for a minimum time varying from 5 seconds to 2 minutes for pressures between about 300 and 140 pounds per square inch, respectively, whereby the mixture is converted into a non-plastic mass having a vitreous apperance, shaping the resulting mass into particles without at any time converting it into a plastic mass, and calcining said particles whereby said calcined particles have a crushing strength in excess of 40 pounds.

5. A process for manufacturing an improved solid catalyst which comprises mixing from about 60 to 80% (calculated as $P_2O_5$) of pyrophosphoric acid with powdered kieselguhr, applying a mechanical pressure of at least about 140 pounds per square inch to the mixture at a temperature not exceeding 150° C. for a minimum time varying from 5 seconds to 2 minutes for pressures between about 300 and 140 pounds per square inch, respectively, whereby the mixture is converted into a non-plastic mass having a vitreous appearance, heating the mass to substantially dry it, granulating it and calcining the product to produce catalyst particles having a crushing strength in excess of 40 pounds.

6. A phosphoric acid-kieselguhr catalyst prepared according to the process of claim 5, said catalyst comprising from about 60 to 80% (as $P_2O_5$) of an acid of phosphorus and having a vitreous appearance and a crushing strength in excess of 40 pounds.

References Cited in the file of this patent

UNITED STATES PATENTS

| | | |
| --- | --- | --- |
| 2,228,131 | Watson | Jan. 7, 1941 |
| 2,650,201 | Mavity | Aug. 5, 1953 |
| 2,694,048 | Bielawski et al. | Nov. 9, 1954 |
| 2,833,727 | Mavity et al. | May 6, 1958 |

FOREIGN PATENTS

| | | |
| --- | --- | --- |
| 463,272 | Great Britain | Oct. 17, 1935 |